May 6, 1941.    W. J. PASINSKI    2,240,798
CALCULATING MACHINE
Original Filed Oct. 21, 1933    9 Sheets-Sheet 1

INVENTOR
Walter J. Pasinski
BY
Rector, Hibben, Davis & Macauley
ATTORNEYS

May 6, 1941.  W. J. PASINSKI  2,240,798
CALCULATING MACHINE
Original Filed Oct. 21, 1933   9 Sheets-Sheet 2

INVENTOR
*Walter J. Pasinski*
BY
*Rector, Hibben, Davis & Macauley*
ATTORNEYS

May 6, 1941. W. J. PASINSKI 2,240,798
CALCULATING MACHINE
Original Filed Oct. 21, 1933 9 Sheets-Sheet 6

INVENTOR
Walter J. Pasinski
BY
Rector, Hibben, Davis + Macauley
ATTORNEYS

May 6, 1941.　　　W. J. PASINSKI　　　2,240,798
CALCULATING MACHINE
Original Filed Oct. 21, 1933　　9 Sheets-Sheet 7
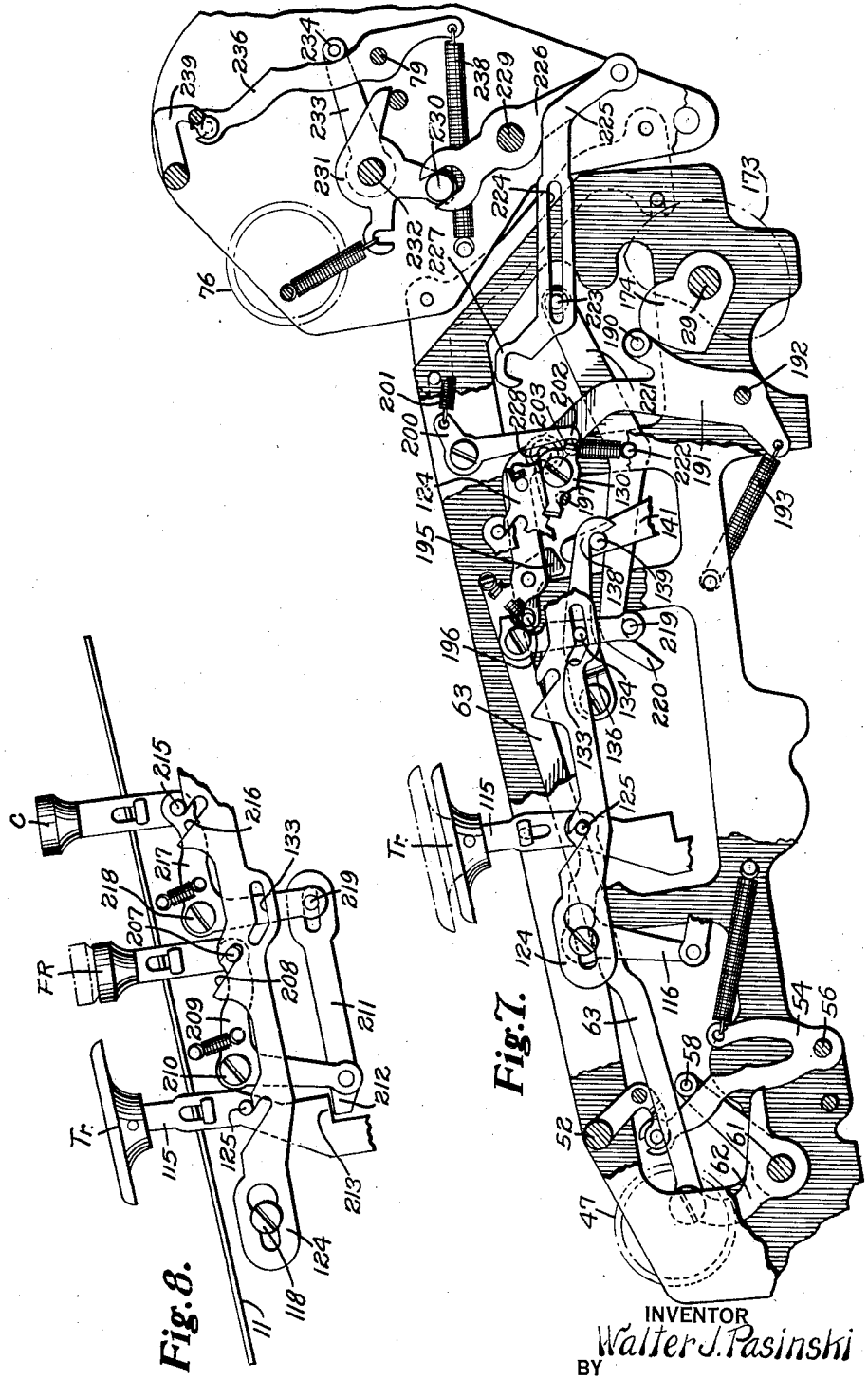
INVENTOR
*Walter J. Pasinski*
BY
*Rector, Hibben, Davis & Macauley*
ATTORNEYS May 6, 1941.  W. J. PASINSKI  2,240,798
CALCULATING MACHINE
Original Filed Oct. 21, 1933  9 Sheets-Sheet 8
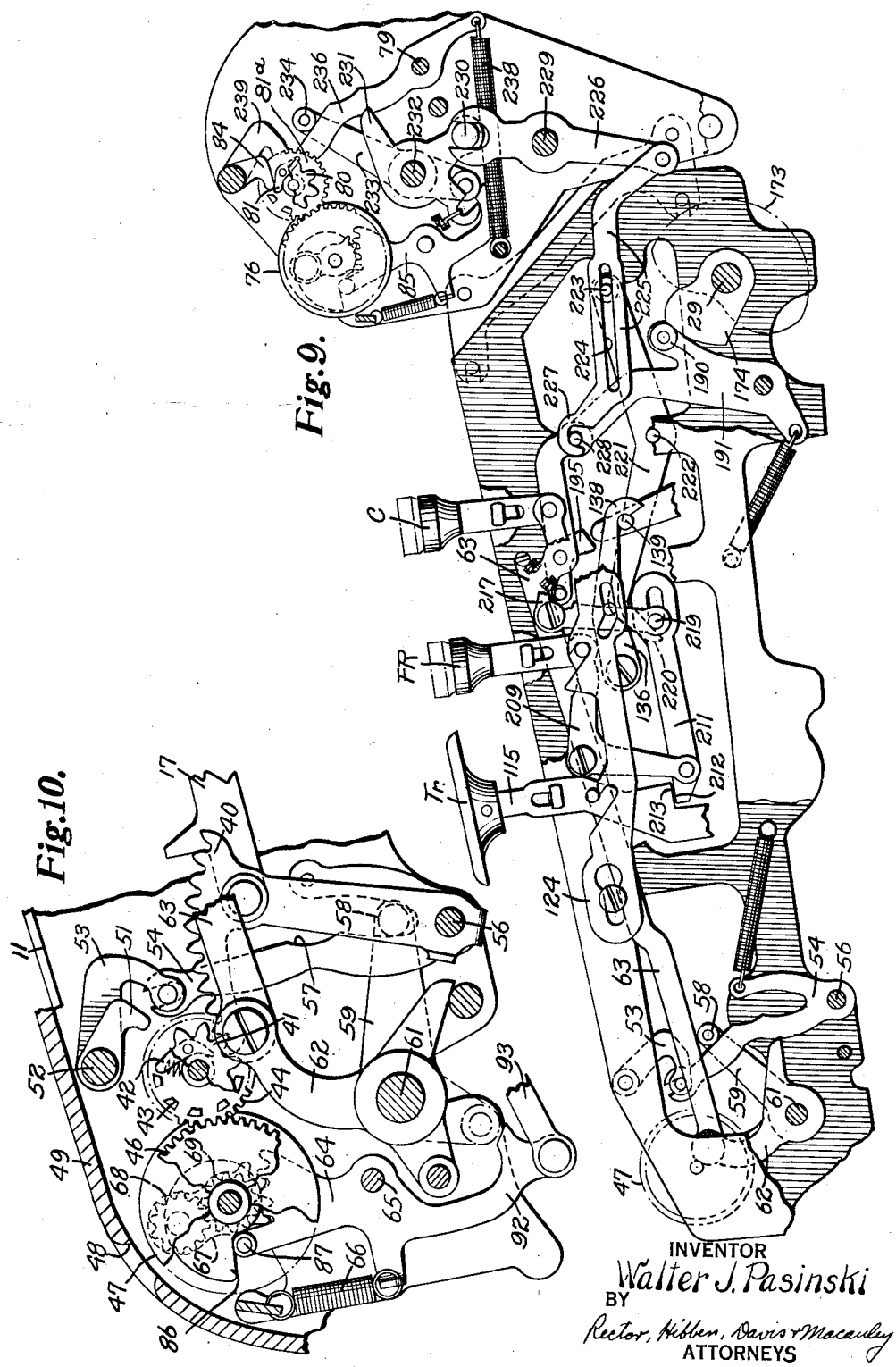
INVENTOR
Walter J. Pasinski
BY
Rector, Hibben, Davis & Macauley
ATTORNEYS

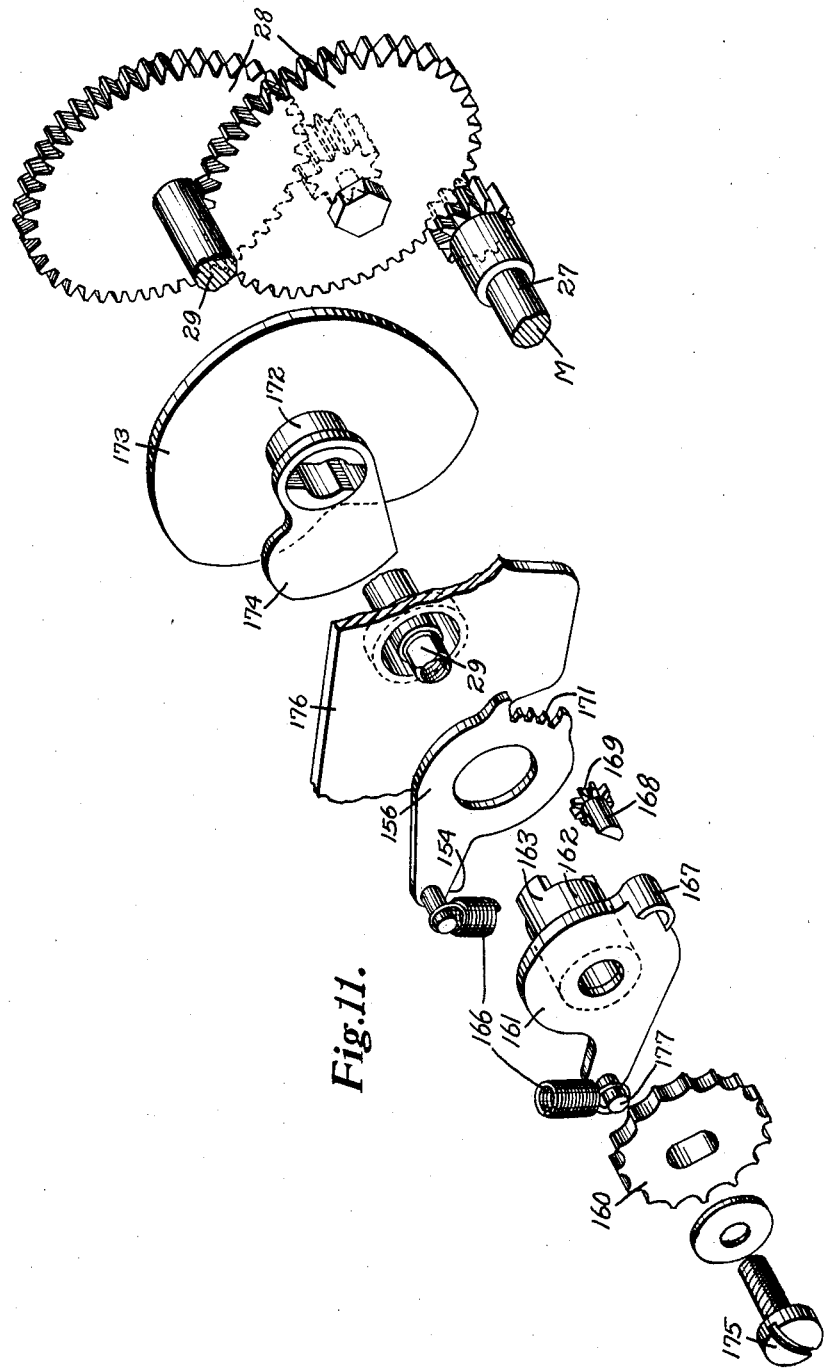

Patented May 6, 1941

2,240,798

UNITED STATES PATENT OFFICE 2,240,798

CALCULATING MACHINE

Walter J. Pasinski, Howell, Mich., assignor to Burroughs Adding Machine Company, Detroit, Mich., a corporation of Michigan Application October 21, 1933, Serial No. 694,550
Renewed May 13, 1938

10 Claims. (Cl. 235—62)

This invention relates to calculating machines and it is particularly applicable to an amount-key-responsive calculator, that is, a calculator in which, when an amount key is depressed, a differential mechanism will respond immediately through being key actuated, or electrically actuated as in Pasinski Patent No. 1,909,714, to enter the corresponding digit in a registering mechanism.

The items entered on the keys of this type of calculator are thus immediately accumulated and the total may be read at any time from visual dials that are associated with the registering mechanism. When a new set or group of items is to be added, the registering mechanism must be cleared of the total of the first group and, unless the operator makes a longhand record of the first total, it is lost. It is frequently desirable to obtain a grand total of a series of totals and for this purpose a second registering mechanism must be provided with provisions for transferring totals from the first registering mechanism to the second. This presents considerable difficulty in an amount-key-responsive type of calculator because the totals cannot be transferred as in other types of calculating machines by the use of the regular differential mechanism. A special total transfer mechanism must be provided and because the mechanism must be special and because of the mechanical difficulties and the seemingly impossible practical problem of accurately transferring the totals when the registers are separated a substantial distance, said registers have always been located close together in this type of calculator. An example of prior constructions is shown in Turck Patent No. 1,391,220.

It is desirable, however, to have the registering mechanisms widely separated so that the operator will not confuse the group total with the grand total and, preferably, the "item-receiving" registering mechanism should be at the front and the "total-storing" register at the rear of the machine. However, prior to the present invention, this had never been accomplished in an amount-key-responsive type of calculator because of the difficulties involved. The present invention has been devised to accomplish this result in a simple, inexpensive and practical manner.

Another problem is that of clearing the registers without requiring the operator to manipulate several members and without requiring complicated operations that might result in confusion. The present invention provides a very simple arrangement whereby, upon the depression of one key, the total is transferred and the "item-receiving" register cleared; upon the depression of another key, the "item-receiving" register may be cleared without transferring the total; and, upon depression of a third key, the "total-storing" register as well as the "item-receiving" register is cleared.

The general object of the invention is to provide an improved amount-key-responsive calculator having two registering mechanisms with provision for transferring totals from one to the other.

A more particular object is to provide improved clearing mechanism in a plural register amount-key-responsive calculator.

Other objects and advantages of the invention will appear from the following specifications and the drawings which illustrate and describe one embodiment of said invention.

Other objects and advantages will be apparent from the following description of one embodiment of this invention given in connection with the drawings in which;

Fig. 7 is a view similar to Fig. 5, but illustrating the machine after the amount has been transferred from the front register into the rear register and during the period when the front register is being cleared or zeroized.

Fig. 8 is an enlarged fragmentary detail of the control keys illustrating the front register clearing key being depressed during which operation the front register is cleared without transferring to the rear register.

Fig. 9 is a right side elevation with the "clear" key depressed to clear both front and rear registers simultaneously.

Fig. 10 is a fragmentary detail of the accumulating and zeroizing mechanism for the front register which mechanism is the same for the rear register.

Fig. 11 is a spread perspective of the clutch and cam mechanism showing the associated driving gears and motor shaft, all parts being in normal position; and Fig. 12 is a fragmentary detail illustrating the interlock between the amount keys and the control keys and illustrating how the amount keys are locked against depression when one of the control keys is depressed.

GENERAL CALCULATOR FEATURES

Figure 1:
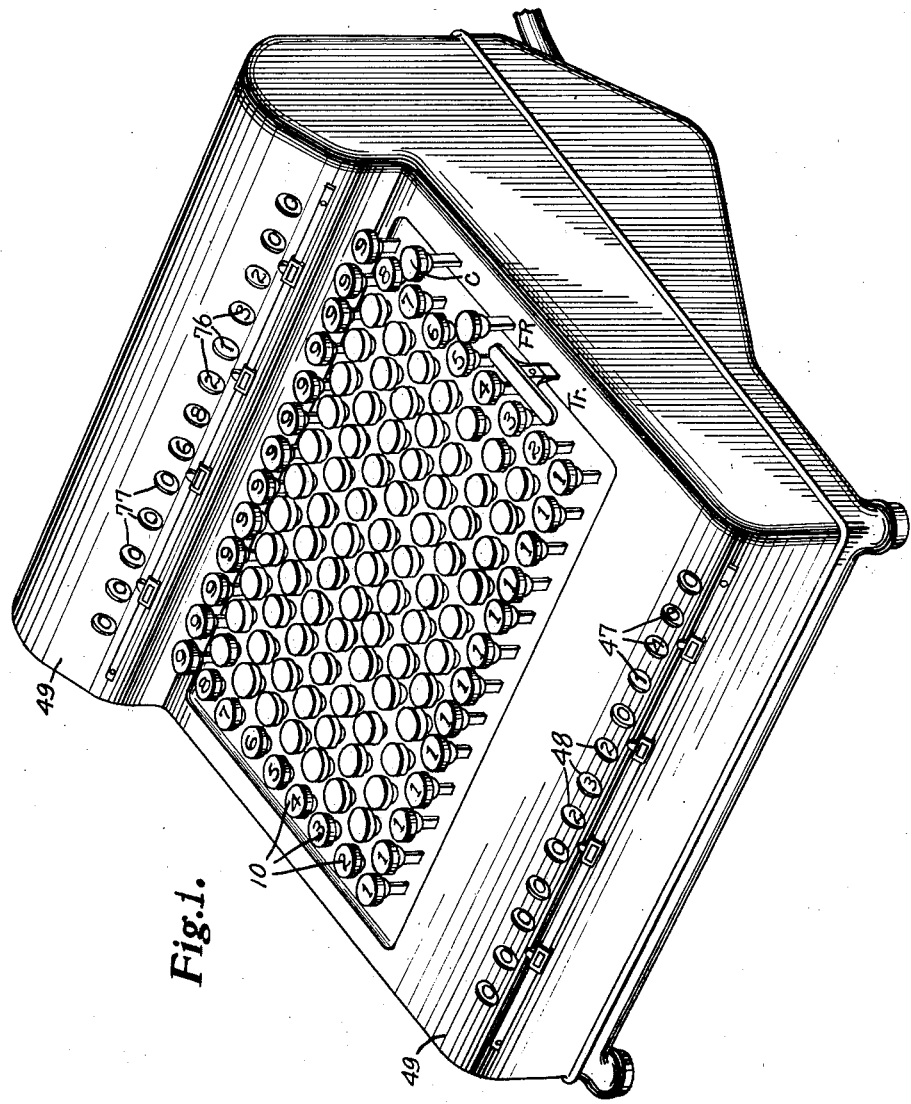
Figure 1 is a perspective view of a complete calculating machine having two registers, one at the front of the machine and the second or duplex register at the rear of the machine illustrating the usual amount keys and bank of control keys.

The caluculating mechanism is similar to and substantially the same as that shown in the Pasinski Patent No. 1,909,714, issued May 16, 1933. For a ready understanding of this invention the general mechanisms of the calculator will be herein described, reference being made to the Pasinski patent for further details of construction.

The machine has a plurality of banks of depressible amount keys 10 (Figs. 1 and 2) supported between an upper keyboard plate 11 and a lower strip 12 (Fig. 2), the keys being urged upwardly by springs 13. The stems of said keys have lateral projections 14 adapted to be engaged by lugs 16 on index bars 17 of the differential mechanism, there being an index bar for each bank of keys. The lower ends of the key stems are adapted to engage slots 18 in slides 19, there being a slide for each key bank which is urged forward by its spring 21. The arrangement is such that, when a key is depressed, its slide 19 is moved rearwardly against the tension of its spring 21 where it is latched in position, the slide then acting to temporarily hold the depressed key in depressed condition and to prevent other keys in the same bank from being depressed. Each slide 19 has a downwardly projecting finger 22 adapted to engage a cross bail 23 pivoted at 24 at both sides of the machine and spring-urged clockwise against said fingers. The bail 23 has a downwardly extending projection 25 adapted to engage and close an electric switch 26 in the circuit of a normally inactive electric motor M. This switch is normally open, but whenever an amount key is depressed the rearward movement of its slide 19 closes the switch to start the motor.

Figure 2:
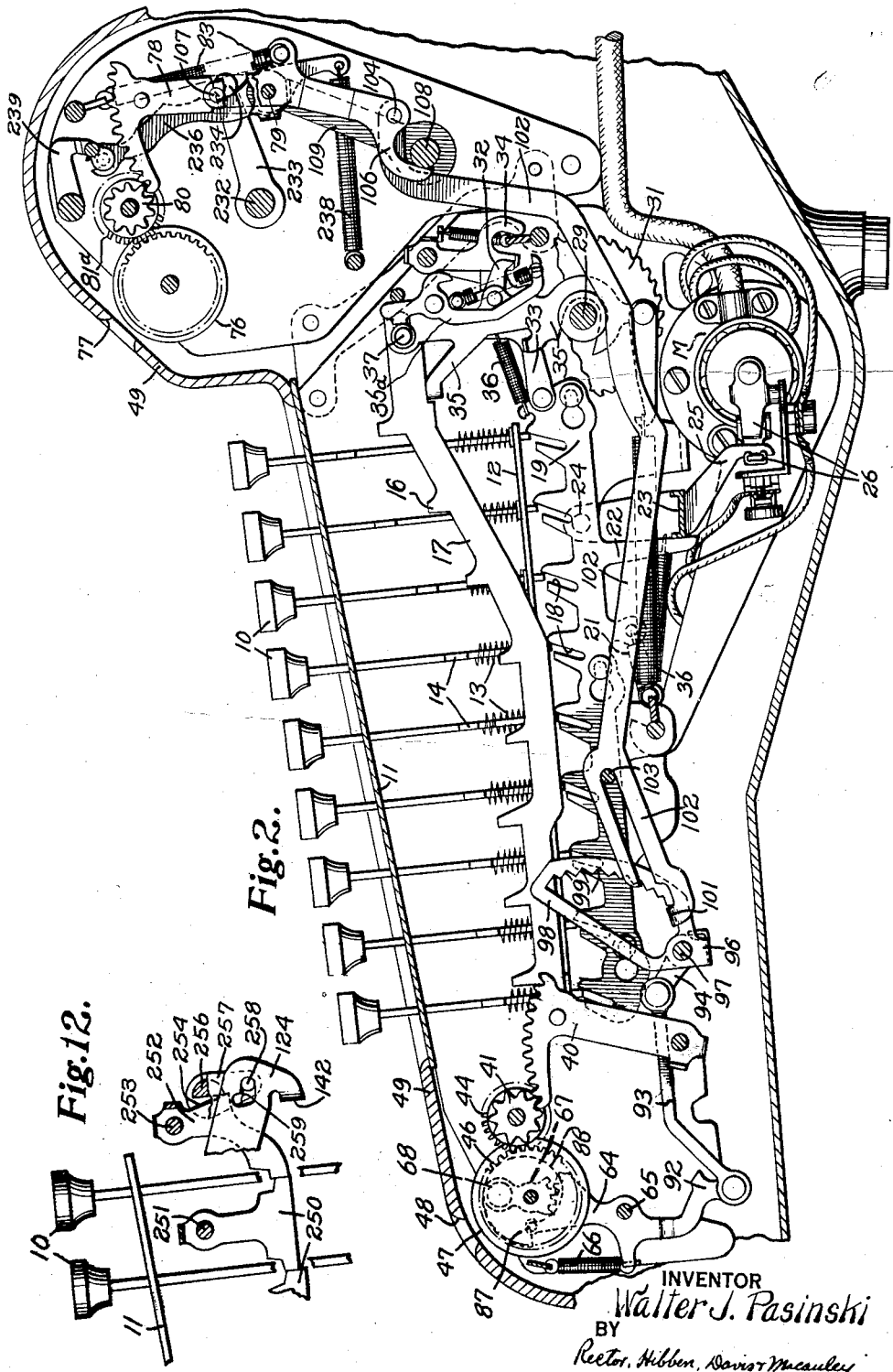
Fig. 2 is a sectional view through the center of the machine showing the mechanism for operating both the front and rear registers with the parts in normal position.

Motor M through its shaft 27 (Fig. 11) and a train of gears 28 drives a main operating shaft 29 which latter shaft extends across the entire width of the machine. Fixed to shaft 29 in each of the various banks of the machine is a toothed ratchet disk 31 (Fig. 2) which is rotated counterclockwise as shown in Fig. 2 by motor M. Each ratchet disk 31 is provided with a pawl 32 adapted to engage said disk but normally held out of such engagement by a latch 34. When a key is depressed in a given bank the rearward movement of its slide 19, acting through a link 33, releases its latch 34. Each pawl 32 is pivoted to its lever 35 that, in turn, is pivoted at its lower end to rock about shaft 29, the levers being urged clockwise by springs 36. The upper end of each lever 35 is connected to its index bar 17 through a stud and slot connection 37. The arrangement is such that, when a key is depressed and its slide 19 moved rearwardly, the motor is started, the latch 34 in said bank is released, the pawl 32 engages the ratchet disk 31, and the corresponding index bar 17 is moved forward until its projection 16 engages the projection on the depressed key. When the index bar is arrested, the lever 35 continues to move forward slightly whereupon the stud 37 on the bar 17 causes a member 35ª, pivoted on lever 35, to be rocked clockwise. The rocking of member 35ª disengages the pawl 32 from the ratchet disk 31 and releases the slide 19, whereupon the index bar 17 and the slide 19 are returned to normal by their respective springs and the latch 34 is restored to a position to hold the pawl 32 out of engagement with the ratchet disk 31. In other words, upon depression of an amount key in any bank, the motor is started, the index bar for said bank is connected to the motor drive and then moved forward to differential position, after which said index bar is disconnected from the motor drive, the parts returned to normal, and the motor stopped. This mechanism is described at more length in Pasinski Patent No. 1,909,714 to which reference may be made for details.

*"Item-receiving" registering mechanism*

An "item-receiving" registering mechanism is located at the front of the machine, said mechanism hereinafter being called the "item-receiving" or "front" register.

This register is of the type disclosed in Horton Patents Nos. 1,326,501 and 1,415,174 and Pasinski Patent No. 1,909,714. It comprises a plurality of register pinions 46 having dials 47 attached to them which are visible through openings 48 in the front part of the casing 49 (Fig. 1). A suitable tens-transfer mechanism is provided as described in said Horton patents. The items are entered in this registering mechanism as follows:

The forward end of each index bar is pivotally connected to a toothed actuator 40 that meshes with a gear 41 carrying a pawl 42 (Fig. 10). The pawl 42 is adapted to engage studs 43 on a gear 44 to rotate said gear 44 when the gear 41 is rotated counterclockwise. When said gear 41 is rotated clockwise, the pawl ratchets over the studs without moving gear 44. The gear 44 is in mesh with the register pinion 46 attached to the dial 47 of the "item-receiving" register. The operation of the registering mechanism is described in more detail in said Pasinski patent but, briefly, is as follows:

Upon depression of an amount key and the resulting forward movement of its index bar 17 as above described, pawl 42 carried by gear 41 is moved in a clockwise direction and ratchets over the studs 43 without moving the gear 44 but, upon the return movement of the index bar 17, gear 44 is rotated counterclockwise by engagement of the pawl 42 with one of the studs 43, and the corresponding register pinion 46 and dial 47 are rotated to enter the digit corresponding to the key depressed.

As described in said Pasinski patent, these operations take place almost instantly so that whenever the operator depresses a key in any bank the motor is started and the digit corresponding to said key is instantly entered in the item-receiving register. The differential mechanism is instantly responsive to depression of an amount key and the item is entered in the item-receiving register by merely depressing said amount keys instead of requiring depression of keys and a succeeding cycle of operation of the machine such as required in other types of calculating machines.

To clear or zeroize register pinions 47 it is necessary to release pawl 42 to permit clockwise rotation of gear 44 and consequent counter-clockwise rotation of register pinion gears 46 as shown in more detail in the Horton Patent No. 1,326,504. Accordingly, a series of fingers 51 (Fig. 10), there being a finger for each pawl 42, are actuated to release the driving pawls 42. Fingers 51 are mounted upon a rock shaft 52 to which is also secured an arm 53 carrying upon its end a stud which engages the forked end of a cam lever 54 pivoted about a shaft 56. Cam lever 54 is formed with a cam edge 57 engaged by a cam roller 58 (Fig. 9) carried upon the end of an arm 59 secured to rock shaft 61 extending across the width of the machine to which is also secured an arm 62 which, in turn, is connected to an actuating link 63. Means for moving link 63 will be described later.

When in normal position roller 58 occupies the position shown in Fig. 10, but when shaft 61 is rocked counterclockwise, roller 58 rocks cam lever 54 counterclockwise to the position shown in Figs. 7 and 9 to cause fingers 51 to engage their respective pawls 42 to release the latter from stud 43 and permit clockwise rotation of gear 44 and consequent counterclockwise rotation of pinions 47 to zero position.

When released the register pinion levers 64 pivoted at 65 and urged clockwise by springs 66 rotate register pinions to zero positions. This is accomplished through arm 67 and gears 68 and 69 carried by the arm and by the register pinion, respectively. For further desciption of the zeroizing or clearing mechanism associated with the register reference is made to the Horton Patents Nos. 1,326,504 and 1,415,174, and the Pasinski Patents Nos. 1,909,714 and 2,017,104, the present clearing mechanism being similar to that shown in these patents.

*"Total-storing" register*

The registering mechanism to which the totals are transferred, which will hereinafter be called the "total-storing" or "rear" register, is located at the rear of the machine as shown in Figs. 1 and 2, said registering mechanism being provided with a plurality of register pinions having dials 76 attached to them that are visible through openings 77 in the casing 49 (Fig. 1). Thus, the "total-storing" register is separated from the "item-receiving" register by the length of the machine and is in a position where its dials may be easily read by the operator immediately to the rear of the keyboard, and in a position slightly above the keyboard such that quick reading is facilitated.

The "total-storing" register is of the same type as the "item-receiving" register and totals are entered in it by means of actuators 78 (Fig. 6) pivoted at 79. These actuators engage pinions 80 for driving the pawls 81 that, in turn, rotate the gears 81a that rotate the register pinions as in the case of the "item-receiving" register. In entering totals in the register, the actuators 78 are rocked counterclockwise to differential positions, during which movement the pawls 81 ratchet idly, and said actuators are then restored clockwise to normal, during which movement the pawls 81 rotate gears 81a and the register pinions.

A zeroizing or clearing mechanism is also provided for the rear register similar to the front register clearing mechanism and comprises generally a releasing pawl 84 (Fig. 6) for releasing driving pawl 81, a spring actuated zeroizing lever 85 and associated gears for returning the register pinions 76 to zero when released.

The rear register does not, however, receive amounts directly from the keys as does the front register but receives amounts which are transferred to it from the front register as will now be described.

*Transferring total and clearing "item-receiving" register*

At the option of the operator, the total in the "item-receiving" register may be transferred to the "total-storage" register and the "item-receiving" register cleared so that it is available for accumulation of a new group of items.

Each register pinion 47 of the front register is provided with a snail cam 86 (Figs. 2, 3 and 10) of uniform rise, which cam is engaged by a stud 87 on the upper end of the lever 64 that is pivoted at 65 and urged clockwise by the spring 66. When a register pinion is in "0" position, the stud 87 on its lever 64 engages the low point of the snail cam 86 as shown in Fig. 2. As the register pinion moves from its "0" to its "9" position, the lever 64 is swung progressively counterclockwise about its pivot, its various positions corresponding to the digital positions of the register pinion. The lower or depending arm 92 (Fig. 3) of each lever 64 is connected to a link 93 that extends rearwardly to where it is connected to an arm 94 of a yoke 95 pivoted on a cross shaft 97. The yoke 96 has a rearwardly extending loop-like portion 98 (Fig. 3) whose rear inner edge is provided with shoulders 99 corresponding to the various digital positions of the register pinion that controls it. These loops 98 and the associated parts for controlling them form a series of differential index devices that constantly reflect the numerical condition of the front register without interfering with its operation. The yokes 96 with their loops 98 and the stepped shoulders 99 are constantly positioned in accordance with the amount in said register.

When it is desired to transfer a total from the front register to the rear one, the shoulders 99 of the respective index devices are engaged by the lugs 101 on the ends of the links 102 that extend forwardly from the rear of the machine, their forward ends being slidably supported by studs 103. The rear end of each link 102 extends upwardly to where it is pivotally connected at 104 to a downwardly extending arm 106 journaled on the shaft 79 and secured by a stud 107 to its actuator.

Normally, the actuators 78 for the rear or "total-storing" register, which are urged counterclockwise by their springs 83, are blocked against counterclockwise movement by a bail 108 (Fig. 2) that is supported by arms 109 and 109a (Figs. 2 and 6) at the respective sides of the machine. The bail 108 engages the lower ends of the arms 106 that are attached to the actuators as shown in Fig. 2.

Figure 3:
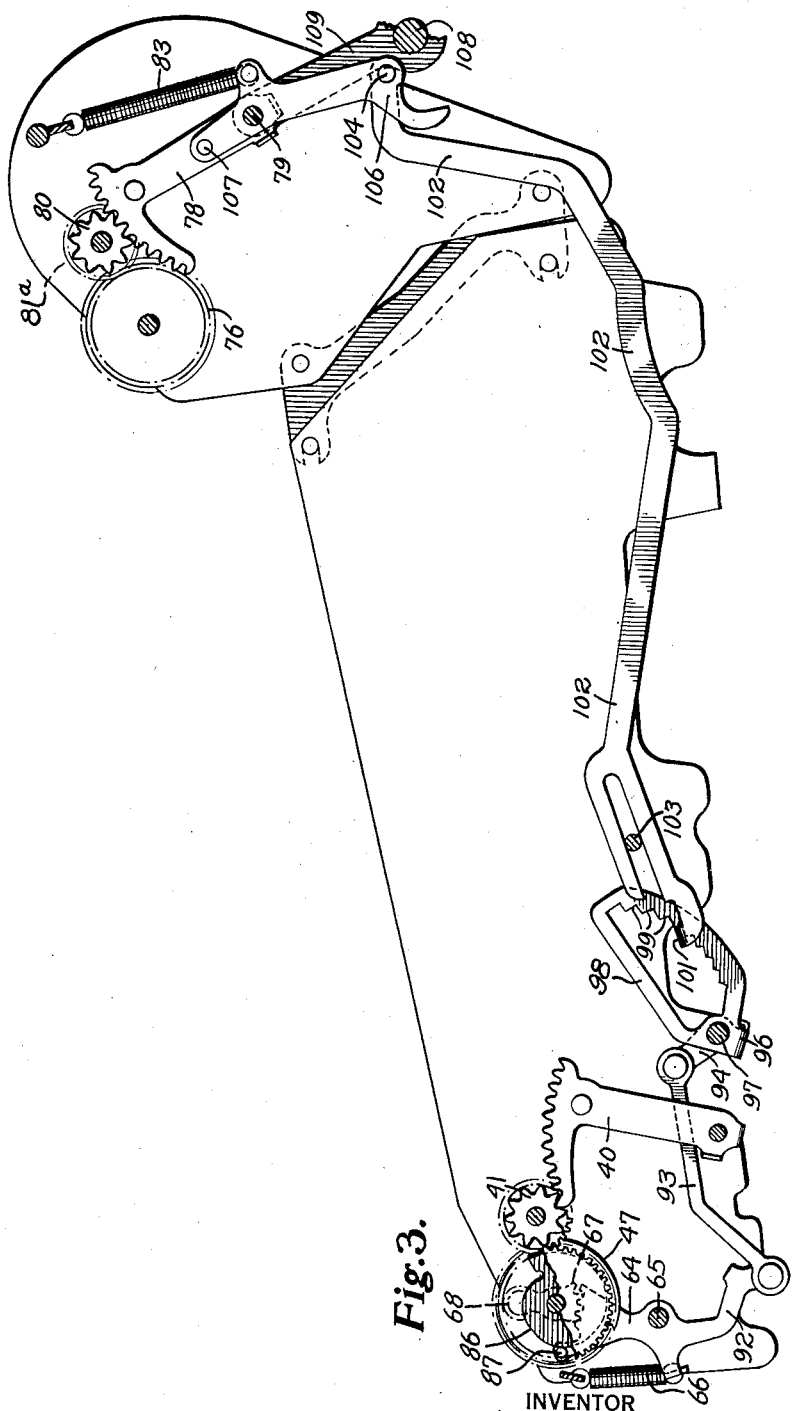
Fig. 3 is a diagrammatic view of the two registers, the actuating racks and differential mechanisms therefor, the front register being indexed to No. 5 position from the previous machine operation with the amount being transferred into the rear register during the succeeding transfer operation.

When a total is to be transferred, the bail 108 moves rearwardly as will be later explained, whereupon the actuators 78 move counterclockwise under the urge of their springs, thereby moving their respective links 102 rearwardly. These links move until arrested by the engagement of their lugs 101 with the shoulders 99 on their respective index members 98. Thus, the actuators 78 move to differential positions determined by the members 98 which, in turn, reflect the total in the "item-receiving" register. In Fig. 3, the member 98 and lug 101 are in the position caused by depression of the No. 5 key, that is, lug 101 is limited by the sixth notch of index stop 98, one notch being for the "0" position.

During this differential positioning of the actuators 78, the total is not actually entered in the "total-storing" register. However, when the bail 108 is restored to normal, the differentially positioned actuators 78 are restored to normal and during this movement of the actuators the total is entered in said "total-storing" register.

The operator may cause a total transfer to take place by simply depressing a total-transfer key TR (Fig. 1) which is a "live" key, that is, a key that starts the motor and causes it to operate the total-transfer mechanism.

Figure 4:
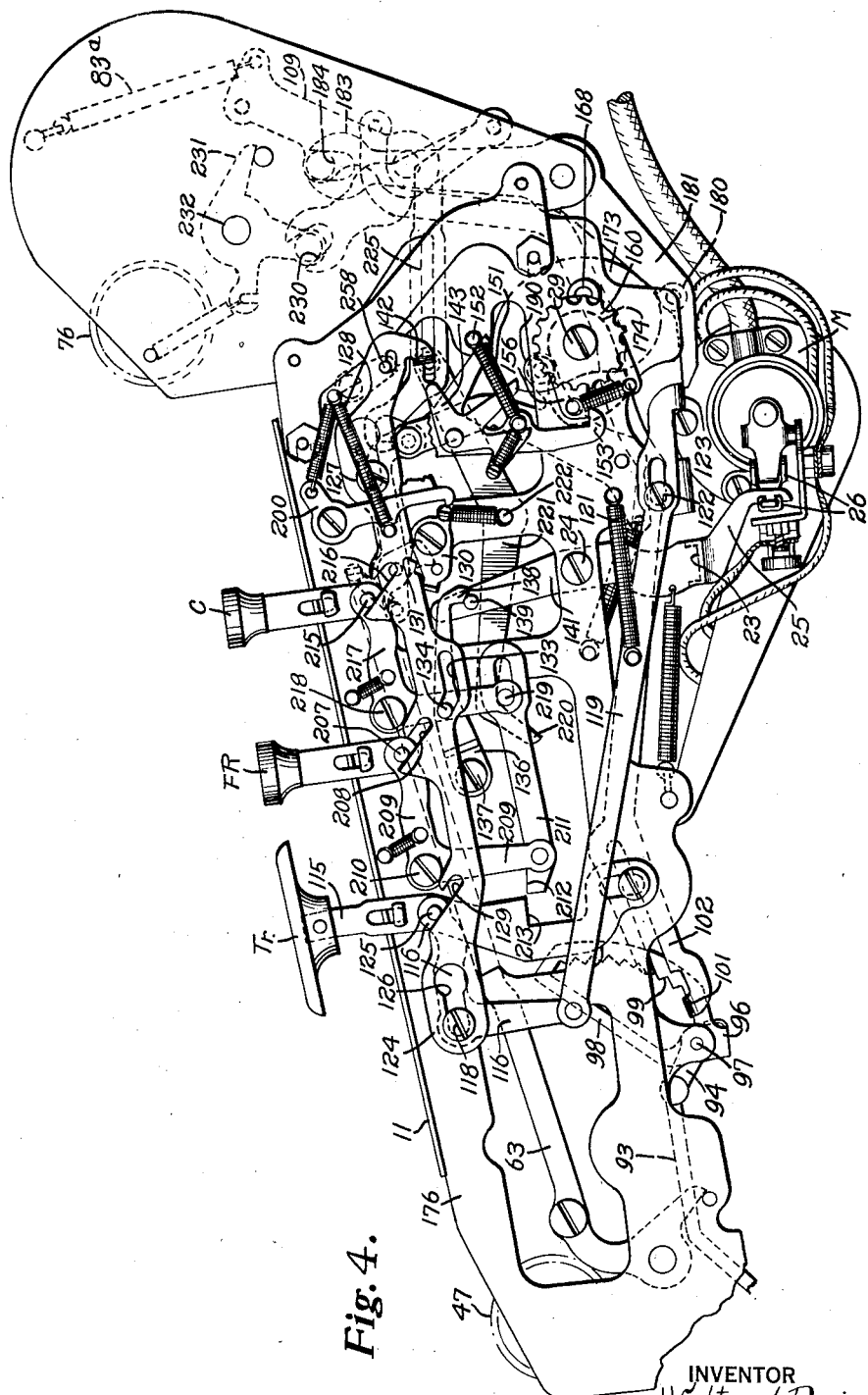
Fig. 4 is a right side elevation with the casing removed illustrating the various control levers with all parts in normal position.

The total-transfer key TR has a bar-shaped key top attached to a sliding key stem 115 intermediate whose ends is connected a crank 116, pivoted at 118 (Fig. 4). The other end of crank 116 is connected to one end of a link 119 normally urged to the rear, or the right as shown in Fig. 4, by spring 121 which spring also urges the transfer key to upper or normal position. The rear end of link 119 is slidingly supported by a stud 122 and terminates in a lug 123 which controls the actuators 78 and the bail 108 as will later be explained. The pivot stud 118 slidingly supports the forward end of a slide 124 having a key hole cam slot 126 formed in the end thereof. The rear end of slide 124 is also slidingly supported by a stud 127 and said slide is urged rearwardly by spring 128 but it may be moved horizontally forward against the action of spring 128. Slide 124 is moved forwardly upon depression of the transfer key TR by engagement of stud 125 with an inclined cam surface 129 formed on the upper edge of the slide, the forward position of the slide being shown in Fig. 5 and its normal position being shown in Fig. 4.

Slide 124 is retained in its forward position by engagement of a detent 130 (Fig. 5) in a notch 131 formed in the lower edge of slide 124. Adjacent notch 131 is a second notch 132 into which detent 130 moves if the slide is not moved its full permissible distance forward, thus preventing restoration of the transfer key and enforcing a full stroke being made.

To energize the motor upon depression of the transfer key, slide 124 is provided with a cam slot 133 (Fig. 5) into which projects a pin 134 carried by a lever 136 pivoted at 137. Upon forward movement of slide 124, pin 134 is cammed downwardly swinging lever 136 downwardly in a clockwise direction. The rearward end of lever 136 is provided with a downwardly projecting hook portion 138 which engages a laterally projecting pin 139 extending from an arm 141 extending upwardly from bail 23, whenever slide 124 moves from its rearward position shown in Fig. 4 to its forward position shown in Fig. 5. Accordingly when the transfer key is depressed the motor is energized by reason of movement of slide 124 actuating bail 23 which in turn closes the switch 26, the switch remaining closed during the transfer operation until the release of pin 139.

Figure 5:
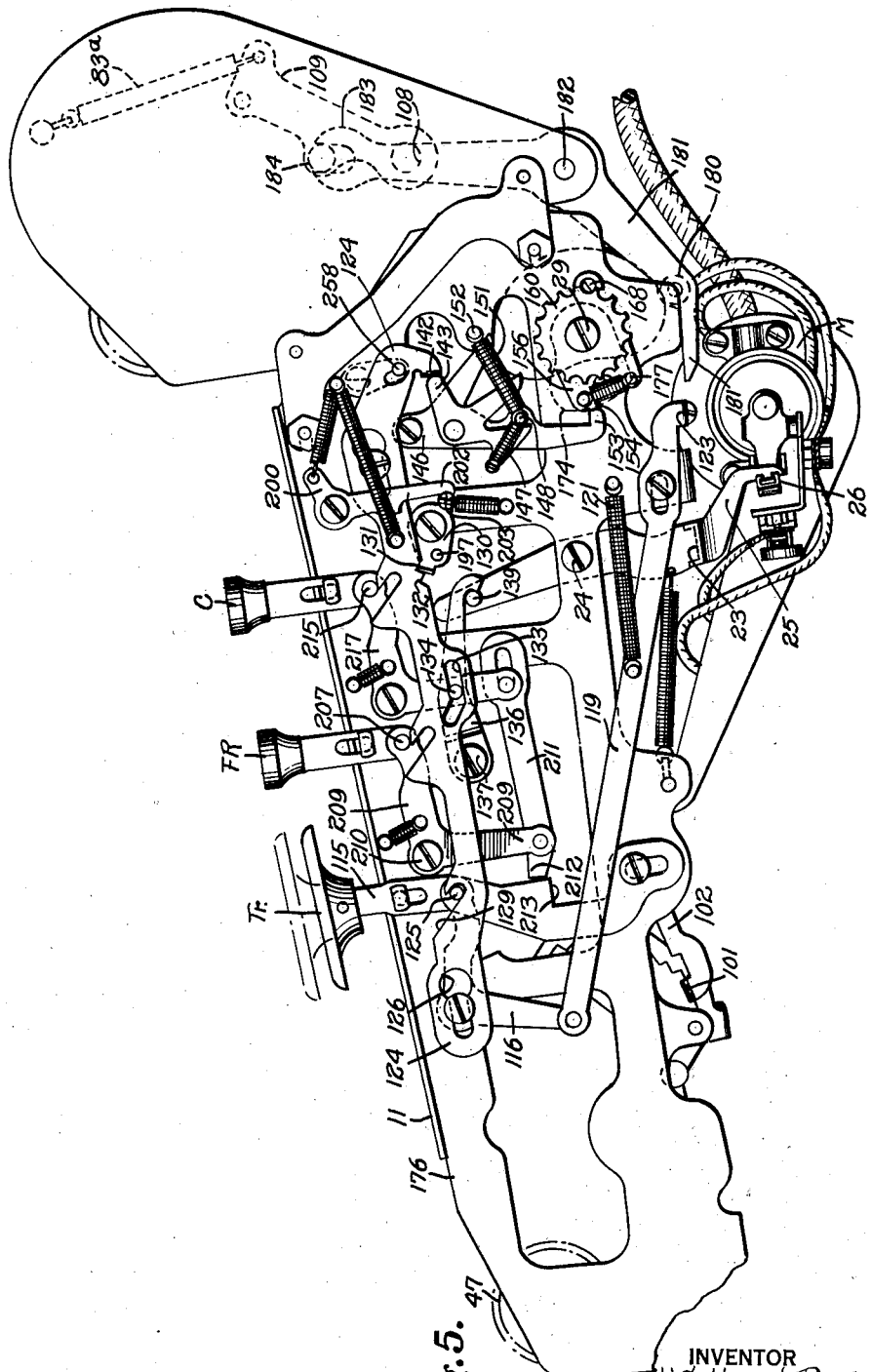
Fig. 5 is a view similar to Fig. 4 but illustrating the transfer key depressed and before the machine is operated.
Figure 6:
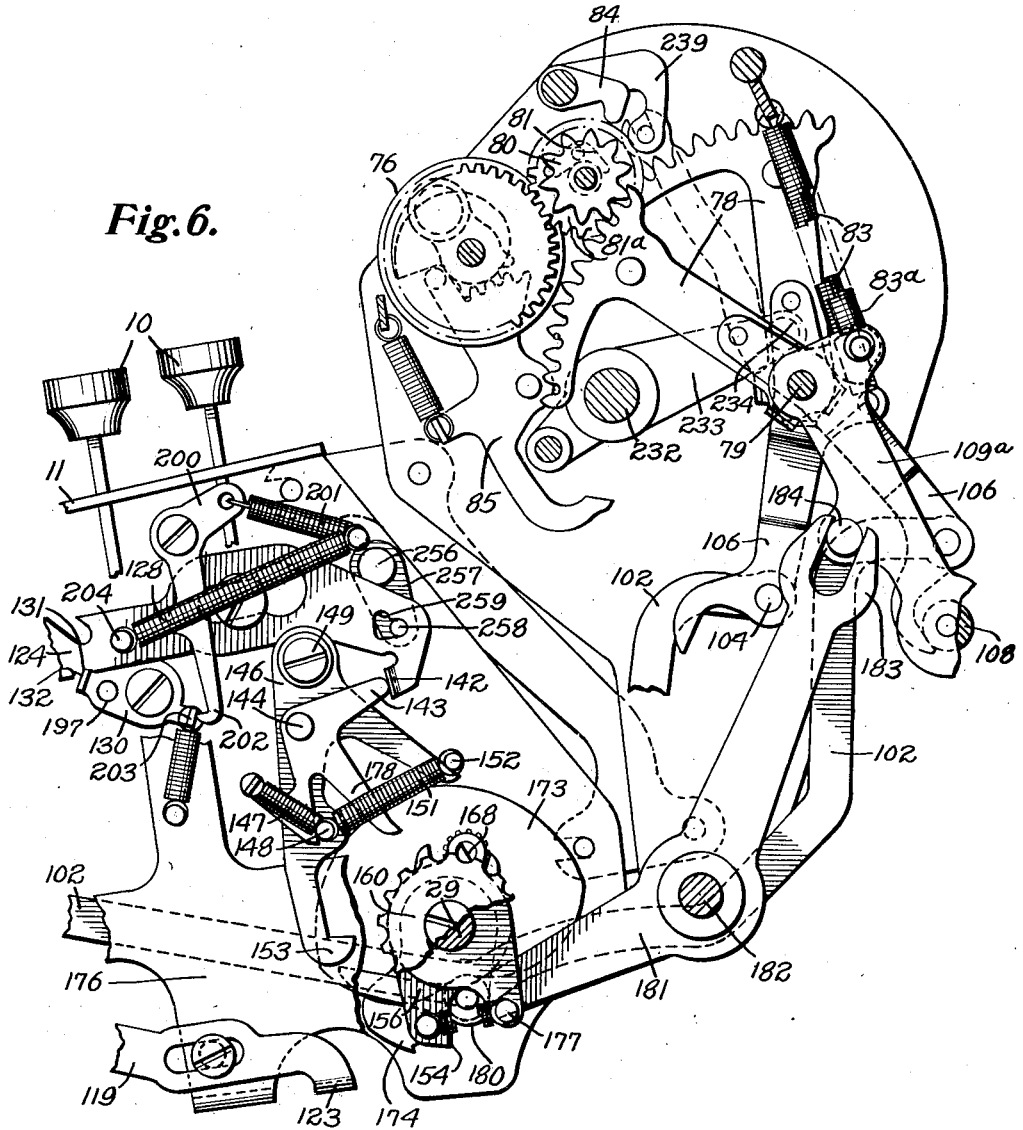
Fig. 6 is an enlarged or partial elevation of the rear of the machine during a transfer operation, illustrating an amount being transferred into the rear register from the front register.

The transfer key also operates a clutch mechanism for which reason the rear end of slide 124 is provided with an integral lug 142 (Figs. 4, 5 and 6) which engages the upper arm 143 of a three-armed lever pivoted at 144 (Fig. 6) to bell crank lever 146. The three-armed lever 143 is urged in counterclockwise direction by a spring 147 whereas bell crank lever 146 is pivoted at 149 and is urged in counterclockwise direction by a spring 151 until limited by a stud 152. Slide 124 therefore has a yielding driving connection to bell crank lever 146 through the three-armed lever 143. When in normal position, the lower hooked end 153 of bell crank lever 146 lies beneath the nose 154 of a clutch control disk 156 (Fig. 4) but when the slide 124 is moved to the left or forward position as shown in Figs. 5 and 6, the hooked end 153 of bell crank lever 146 clears the nose 154 of clutch lever 156 and releases it.

Referring more particularly to Fig. 11, it will be seen that the end of shaft 29, which is driven by the motor when the latter is started, is flattened upon two sides to receive a driving clutch disk 160 having a similarly shaped aperture therethrough whereby clutch disk 160 rotates with shaft 29. This driving clutch disk has a series of curved notches on its periphery for a purpose that will presently appear. Rotatably supported on shaft 29 immediately adjacent the disk 160 is a driven clutch plate 161 having a hub 162 terminating in drive teeth 163. The clutch control disk 156 is journaled on hub 162 and is urged in one direction relatively to plate 161 by spring 166 connecting the plate and disk.

Plate 161 has a lateral extension 167 which constitutes a bearing for a half round clutch dog 168 terminating in teeth 169 which mesh with teeth 171 formed in the peripheral edge of disk 156. The half round or semi-circular clutch dog 168 is adapted to engage clutch disk 160 by engagement with the tooth like peripheral edge thereof when turned to one position and to release the disk when turned in another position.

Normally the control member 156 is held with the clutch dog in release position against the action of spring 166 by engagement of the hooked end 153 of the bell crank 146 with the nose 154 of the control disk 156. When the bell crank lever 146 is withdrawn, however, spring 166 rotates the control disk 156 counterclockwise in Fig. 11 which, in turn, rotates the dog 168 clockwise to cause it to lock the driving clutch disk 160 to the driven plate 161 so that the entire clutch assembly will rotate with the shaft 29.

The drive teeth 163 of the sleeve 162 drivingly engage a sleeve 172 journaled on shaft 29 which carries a pair of cams 173 and 174 for effecting transfers and clearing the register or registers as will be presently explained. The entire clutch assembly is retained upon the end of shaft 29 by a screw 175 threaded into the end of shaft 29, and which secures disk 160, plate 161 and disk 156 to the shaft upon one side of the machine frame 176 with cams 172 and 173 upon the other side.

Each rotation of the clutch assembly is limited to a single revolution no matter whether the total-transfer key TR is depressed and released or depressed and held depressed. Assume, first, that said key is depressed and then released. Depression of the key moves the control slide 124 forward where it is held by detent 130, the slide 124 serving to hold the key TR depressed. Normally, near the end of a revolution of the clutch, the detent 130 is released as will be presently explained, whereupon the control slide 124 is returned rearward to normal by its spring and this results in restoring the total-transfer key TR to normal and in opening the motor switch. Thus, in the normal operation of the machine by depression and release of the key TR, the control parts that are conditioned by depression of said key are automatically restored to normal near the end of a cycle of operation. It still remains to describe how the rotation of the clutch assembly is limited to one revolution under all conditions.

Referring to Figs. 6 and 11, when the key TR is depressed, the control slide 124 moves forward and the lug 142 on said slide engages the nose of the upper arm of the three-armed lever 143. This rocks the clutch tripping member 146 clockwise against the tension of its spring, the three-armed lever 143 being blocked against counterclockwise rotation on member 146 by stud 148. The clutch is thus rendered active and it starts to rotate. The driven clutch plate 161 has a stud 177 located so that, as said plate rotates counterclockwise, the stud will engage the arm 178 of the three-armed lever 143 (Fig. 6). The parts are positioned so that this engagement occurs after about three-quarters of a revolution of the clutch assembly. When it occurs, the three-armed lever 143 is rocked clockwise on its pivot against the tension of its spring 147 which moves the nose of the upper arm of said lever out of engagement with the lug 142 of the control slide 124. This frees the clutch tripping member 146 which is thereupon rocked counterclockwise to normal by its spring 151, the spring 151 being stronger than spring 147 and the stud 177 passing the arm 178 quite quickly. The clutch tripping member 146 having been returned to normal, the nose 154 is in the path of the projection or shoulder on the clutch control member 156 with the result that, as the clutch assembly approaches the end of a single revolution, the rotation of the clutch control member 156 is arrested. The continued rotation of the remainder of the clutch assembly causes rotation of the clutch dog 168, which thereupon releases the driven disk 161 from the driving disk 160. Thus, after one revolution of the clutch assembly, the clutch is automatically disengaged.

In the above operation of the parts, when the clutch tripping member 146 moves counterclockwise to normal, the nose of the upper arm of the three-armed lever 143 moves under the lug 142 on the control slide 124 so that said slide cannot control the clutch tripping member until the slide has been moved rearward to permit the three-armed lever 143 to be rocked back to normal by its spring.

From the above it will be clear that the clutch stops after one revolution independently of the control slide 124. If said slide is moved forward and released near the end of the cycle, the clutch will have stopped. If the slide is moved forward and held forward, as by continued depression of the key TR, the clutch will nevertheless have stopped and the forward position of the control slide 124 will not cause a second revolution of said clutch because the slide has no control of the clutch until after it has been moved rearward again and then moved forward as by depression of the key TR.

Before describing how the detent 130 for slide 124 is released near the end of each cycle, the operation of the total-transfer and front-register-clearing mechanisms will be explained.

During each single revolution of the clutch mechanism cams 173 and 174 are also given a single revolution. Cam 173 is utilized to actuate cross bail 108 to enable the actuators 78 for the rear register to transfer an accumulation from the front register into the rear register. After operation of cam 173, cam 174 functions to cause a clearing or zeroizing of the front register. In view of the fact that one operation follows the other, that the relation and position of the two cams 173 and 174 are important.

With the machine in normal position at rest, a roller stud 180 (Figs. 5 and 6) carried adjacent the lower and forwardly projecting end of a lever 181 pivoted at 182 engages the higher point of cam 173 (Fig. 5). Lever 181 extends upwardly and terminates in a forked end 183 which engages a stud 184 (Fig. 6) carried by an arm 109ª (Fig. 6) pivoted on shaft 79 which arm supports the right end of bail 108, the left end being supported by arm 109 (Fig. 2). As cam 173 is rotated, the roller stud 180 follows it, the arm 181 being held in engagement with the cam edge by the springs 83ª (Figs. 4 and 6) that urge the bail 108 to the rear, the bail 108 acting on arm 181. The timing is such that, during the first half revolution of the clutch, the arm 181 is permitted to move so that bail 108 moves to enable the actuators to be moved by their springs to differential positions. During the latter half of the cycle, the cam 173 engages the roller stud 180 and rocks the lever 181 to return the bail 108 to normal, thus restoring the actuators and entering the total in the registering mechanism.

It will be understood that bail 108 always travels the full distance at each full revolution of cam 173 sufficient to permit an amount of nine digits to be entered in any of the register wheels 76 of the rear register, after which stud 180 again reaches the high point of the cam returning bail 108 and restoring actuator rack 78.

Operation of lever 181 to withdraw cross bail 108 is prevented unless the transfer key is depressed because lug 123 of link 119 connected to the bell crank 116 operated by transfer key lever 115 overlies the forwardly projecting end of lever 181 (Fig. 4) until the transfer key is depressed which, upon rocking bell crank lever 116 moves link 119 forwardly and removes lug 123 from above the projecting end of lever 181.

The cam 174 acts to cause the "item-receiving" register to be cleared during the latter half cycle of the clutch. When the machine is in normal position a stud 190 carried by lever 191 (Fig. 7) lies on the low spot of cam 174 (Fig. 4). Lever 191 is pivoted to the frame of the machine at 192 and is constantly urged clockwise about its pivot by spring 193 (Fig. 7). The upper end of lever 191 is connected to the rear end of link 63 which, it will be recalled, governs the clearing of zeroizing mechanism. Upon rotation of cam 174 lever 191 is rocked to actuate link 63 which in turn causes clearing of the front register. The cam 174 is positioned so that it acts during the latter half of the revolution of the clutch and after the actuators of the "total-storing" register have been differentially positioned. Said actuators are positioned in accordance with the position of the differential members that constantly reflect the amount in the "item-receiving" register and, consequently, the clearing of the "item-receiving" register cannot be started before the amount therein has been properly taken off for transfer to the "total-storage" register.

As previously stated the transfer key lever is locked in depressed position by reason of engagement of detent 130 in notch 131 of slide 124 when the latter is in forward position. To release the slide and transfer key, link 63 carries a pass-by pawl 195 (Fig. 7) spring-urged in clockwise direction until limited by its stud 196 engaging the underside of link 63. During the forward movement of link 63 pawl 195 passes over stud 197 carried by detent 130 (Fig. 4), but during return movement of link 63 pawl 195 engages stud 197 and rocks detent 130 out of notch 131 in slide 124 and releases the latter and the transfer key.

Provision must also be made to release the detent 130 when the key TR is depressed and held depressed. Assume that the total-transfer key TR is depressed and held. The clutch assembly will go through only one revolution but the control slide 124 will be held forward by the key TR. The detent 130 for holding this slide forward will also be operative because, while said detent was released by link 63 and pawl 195 during the single operation of the clutch, the detent will automatically restore to latching position near the end of said single revolution and, the control slide 124 being held forward, the detent will again move into the notch to hold said slide forward. Consequently, if the operator should release the total-transfer key TR after holding it depressed for some time, it would not be restored to normal and the control slide 124 would be held forward, making it impossible thereafter to operate the machine because it is necessary that the slide 124 be moved rearwardly before it is again moved forward.

Additional control of detent 130 is provided in the form of a latch 200 (Figs. 4, 5 and 6) pivoted to the side frame and urged clockwise by a spring 201. The lower end of the latch has a nose 202 adapted to engage a lug 203 on detent 130. Under normal conditions with the total-transfer key TR undepressed and the control slide 124 in its rear position, a stud 204 on slide 124 engages the latch 200 and holds it in an inoperative position, as shown in Fig. 4. When the total-transfer key TR is depressed, the slide 124 moves forward, which allows the latch 200 to be rocked clockwise by its spring. However, under these conditions, the nose 202 of latch 200 engages the edge 203 of the detent 130 and no latching action occurs. When, near the end of an operation, the detent 130 is rocked counterclockwise by the pawl 195 on the link 63, said detent 130 is rocked to a position such that the nose 202 passes under the edge of the lug 203 and thus holds the detent in a released position. In normal operations, the parts are restored to normal almost immediately by the rearward movement of the slide 124 which causes stud 204 on said slide to release the latch 200 which, in turn, releases detent 130. If, however, the total-transfer key is held depressed, the slide 124 does not move rearwardly and the detent 130 will be held in an inoperative position. When, subsequently, pressure on the total-transfer key is released, it and its slide 124 will return to normal as they are free of detent 130. Otherwise, if the total-transfer key were held depressed, the detent 130, after having been released by pawl 195 near the end of one cycle, would return to its detaining position and, even though pressure on the total-transfer key were subsequently released, the motor would continue to run and the key TR would not return to normal.

*Clearing the "item-receiving" register only*

It is often necessary to clear the "item-receiving" register without transferring the total in it. Provision is made for enabling the operator to accomplish this result by merely depressing a "live" key FR, called the "front-register-clearing" key.

When the key FR is depressed, it moves the control slide 124 forward in the same manner as when the total-transfer key TR is depressed. For this purpose, the stem of the key FR has a stud 207 operating in a cam groove 208 in the upper edge of the slide 124. Depression of the key FR starts the motor and engages the clutch for causing the cams 173 and 174 to be operated. The cam 174 actuates the link 63 to clear the "item-receiving" or "front" register as previously described, the clutch being stopped after it has gone through one revolution and the control slide 124 being returned to normal in the manner heretofore explained. This also releases the clearing key FR which is restored to normal by its spring. The cam 173 does not cause a total-transfer operation because the lug 123 (Fig. 4) on the link 119 overlies the end of lever 181 that controls bail 108 that must move in order that a total transfer may be effected. This lever 181 can be released only by depressing the total-transfer key TR which does not occur in the above operation and which cannot occur after the clearing key FR has been depressed owing to the fact that a bell crank 209 pivoted at 210 having one arm connected to the stem of the key FR and the other arm connected to the link 211 moves the forwardly projecting nose 212 of link 211 beneath the shoulder 213 on the stem of the transfer key TR. Thus, the transfer key TR cannot be depressed while the FR key is depressed.

From the above, it will be clear that, when the "front-register-clearing" key FR is depressed, the motor is started and the clutch mechanism is rotated through a single cycle during which the front register is cleared but no total transfer takes place, the parts being restored to normal at the end of the cycle.

*Clearing both the "item-receiving" and the "total-storing" registers*

The operator frequently desires to clear the "total-storing" register and, at the time he does this, it is also usually desirable to clear the "item-receiving" register. Consequently, provision is made so that, when the "total-storing" register is cleared, the "item-receiving" register will also be cleared. This can be done by depressing a clearing key C which causes the motor to operate mechanism to clear both registers.

The stem of the clearing key C carries a stud 215 (Fig. 4) adapted to engage in a cam groove 216 in the control slide 124 so that, when said key is depressed, the control slide will be moved forward in the same manner as when the total-transfer key is depressed. Thus, depression of the key C starts the motor and engages the clutch which, thereupon, is rotated through one cycle after which it is stopped, the control slide 124 and the key being restored to normal owing to the fact that the detent 130 releases the slide as heretofore explained.

During this cycle, the "item-receiving" register is cleared in the manner heretofore described, that is, the cam 174 operates the link 63 to cause said register to be cleared and the detent 130 is released near the end of the cycle to permit the control slide 124 to return to normal, to thereby also return the key C to normal.

The "rear" or "total-storing" register is also cleared during this cycle. A bell crank lever 217 pivoted at 218 has one arm connected to the end of the clearing key C and its other arm provided with a stud 219 which engages under the cam end of an arm 220 of a lever 221 pivoted at 222 to the machine frame.

The rear end of lever 221 carries a stud 223 engaged in a slot 224 formed in a lever 225 pivoted at its rear end to a lever 226 and terminating at its front end in a hook 227 which, when in lowered position caused by a depression of key C, engages a pin 228 carried by lever 191 actuated by cam 174 (Fig. 9). Lever 226 is pivoted at 229 to the frame of the machine and terminates at its upper end in a forked end which engages a stud 230 projecting from a lever 231 secured to a cross shaft 232 (Fig. 9). Shaft 232 extends to the left side of the machine where it carries an arm 233 corresponding to arm 59 of the front register zeroizing mechanism. Arm 233 carries a stud 234 engaging a cam lever 236 pivoted on the shaft 79 and being constantly urged clockwise about its pivot by a spring 238. Cam lever 236 has a forked connection with a stud carried by arm 239 similar to arm 53 of the front register mechanism for rocking fingers 84 to release the driving pawls and permitting the register pinions to be returned to zero by the mechanism previously described.

Accordingly, depression of the clearing key C causes mechanism for clearing the "total-storage" register to be connected to the lever 191 that is actuated by the cam 174 so that said clearing mechanism will be operated at the same time that the clearing mechanism for the front register is operated. In other words, depression of the clearing key C starts the motor, and causes the clutch to go through one cycle during which both clearing mechanisms are operated, after which the clutch stops and the mechanisms are restored to normal.

During this operation, no total transfer occurs because the lever 181 controlling the release of the bail 108 is prevented from moving by the lug 123 that overlies one end of the lever and which is releasable only by the total-transfer key TR. And the total-transfer key is prevented from being depressed when the clearing key C is depressed owing to the fact that the downwardly extending arm of bell crank 217 is connected to the link 211 so that, when the clearing key C is depressed, the nose 212 of the link 211 will move under a shoulder on the stem of the transfer key to prevent its depression.

*Interlocks*

Several interlocks are provided for preventing misoperation of the machine.

Provision has been made for preventing depression of the amount keys during depression of any of the control keys and also to prevent depression of the control keys when the amount keys 10 are depressed.

The foregoing interlock is best shown in Fig. 12 from which it will be seen that a pendant 250 is pivoted freely on a cross shaft 251 extending between the rows of keys, there being a pendant between each pair fo keys. Each pendant is formed with a forward and rearward nose which engages the pendants of the adjoining keys in that bank. A control pendant 252 for each bank is carried on a shaft 253 at the rear of each No. 9 key and is provided with a cam 254 engageable with a shaft 256 extending the entire width of the machine and having a flattened portion adjacent each No. 9 key. The pendants 250 and 252 are so arranged that when any one key is depressed in a bank the loose play between the pendants is taken up and it is impossible to depress another key therebetween until the previously depressed key is restored as shown in Horton Patent 1,243,839.

The amount of movement permitted the pendants when the cam edge 254 of the control pendant 252 engages the flat portion of the shaft 256 is just enough to provide room for only one key stem between the pendants so that only one key can be depressed at a time.

Fixed to the extreme right end of shaft 256 is an arm 257 carrying a stud 258 that projects into an L-shaped slot 259 formed in the control slide 124. When the control slide 124 is in its rear or normal position shown in Fig. 4, the stud 255 occupies the vertical portion of the slot 259. This can be clearly understood by referring to Fig. 12 which shows the control slide 124 in its forward position. When said slide is moved rearward to normal from its Fig. 5 position, the front edge of the cam slot 259 engages stud 258 and rocks the shaft 256 counterclockwise as shown in Fig. 4. As this occurs, the stud 258 moves in an arc and the parts are so arranged that, when the control slide 124 reaches its normal position, said stud 258 will be in the vertical portion of slot 259 as shown in Fig. 4.

With the parts in such position, the flat face of the shaft 256 is presented to the cam faces 254 of the control pendants 252. Consequently, any one amount key in any bank can be depressed. But, if such a key is depressed, the cam edge 254 of the pendant 252 for its bank will be moved into engagement with the flat face of shaft 256 which will prevent said shaft from turning. Under these conditions, if an attempt is made to depress one of the control keys TR, FR or C, the control slide 124 cannot move forward because the shaft 256 cannot turn and the control slide 124 is locked to the shaft 256 owing to the fact that stud 258 is in the vertical portion of the slot 259.

On the other hand, if, with the parts in the position first explained, one of the control keys TR, FR or C instead of one of the amount keys is depressed, the control slide 124 will be moved forward. As this occurs, the shaft 256 will be rocked until it occupies the position shown in Fig. 12 where one of its edges engages the cam surfaces 254 of the control pendants 252 and holds these pendants in engagement with the respective banks of pendants so that no amount key in any bank can be depressed. Thus, if one of the control keys TR, FR or C is depressed, no amount key can be depressed.

There has already been described the interlock that prevents depression of the total-transfer key TR when either the front register clearing key FR or the clearing key C is depressed, the same comprising a link 211. This interlock functions as previously described and an explanation of its details will not be repeated.

Provision has also been made that when the transfer key TR is in depressed condition the two remaining control keys, that is, the front register clearing key FR and the clearing key C are locked against depression. As previously described, the front register clearing key FR is connected to a bell crank 209 and the clearing key C is connected to a crank 217 both of which are connected to a link 211 for blocking depression of the transfer key TR when either of the clearing keys is depressed. This is true because the nose 212 of link 211 underlies a shoulder 213 formed on the transfer key lever 115. On the other hand, if the transfer key lever 115 is depressed while either of the register clearing keys FR or C is in raised or normal position the shoulder 213 then lies in front of the nose 212 and prevents depression of either of the register clearing keys FR or C.

The interlock for preventing operation of the transfer mechanism for transferring accumulations from the front register into the rear register unless the transfer key TR is depressed has been described, this interlock comprising the lug 123 which overlies the forwardly projecting end of lever 181 to prevent operation of the latter unless the transfer key has been depressed to remove lug 123 out of possible engagement with link 181.

It will be obvious to those skilled in the art that many changes may be made in the details of construction without departing from the spirit and scope of this invention as defined in the appended claims.

I claim:

1. An amount-key-responsive calculator of the class described having amount keys and a key-responsive differential mechanism for entering items in an item-receiving register, a total-storing register operable to accumulate a plurality of totals, means for transferring totals from the item-receiving to the total-storing register, clearing mechanism for said registers, a motor drive for said clearing mechanism, and control means for said motor drive and said clearing mechanism including two manipulatable members, said control means, upon being conditioned by one of said manipulatable members, operating to cause said motor drive to operate the clearing mechanism to clear the item-receiving register and, upon being conditioned by said other manipulatable member, operating to cause said motor drive to operate the clearing mechanism to clear both registers simultaneously.

2. An amount-key-responsive calculator of the class described having amount keys and a key-responsive differential mechanism for entering items in an item-receiving register, a total-storing register operable to accumulate a plurality of totals, total transfer means for transferring a total from said item-receiving to said total-storing register, clearing mechanism for said registers, means for operating said clearing mechanism and said total transfer means, and control means for conditioning said clearing mechanism and said total transfer means including three manipulatable members, said control means, when conditioned by one of said members, acting to condition said total-transfer means and said clearing mechanism to cause the total in the item-receiving register to be transferred to the total-storing register and the item-receiving register to be cleared upon operation of said operating means; when conditioned by a second one of said members, acting to condition said clearing means to cause the item-receiving register to be cleared upon operation of said operating means; and when conditioned by the third manipulatable member, acting to condition said clearing mechanism to cause both of said registers to be cleared upon operation of said operating means.

3. An amount-key-responsive calculator of the class described having amount keys and a key-responsive differential mechanism for entering items in an item-receiving register, a total-storing register operable to accumulate a plurality of totals, means for transferring a total from said item-receiving to said total-storing register, clearing mechanism for said registers, a motor drive for said clearing mechanism and said total transfer means, and control means for said motor drive and for said clearing and said total transfer mechanism including three depressible keys, said control means acting, upon depression of one key, to cause the motor to operate to cause the total-transfer means to transfer the total in the item-receiving register to the total-storing register and to operate the clearing mechanism to clear said item-receiving register, upon depression of the second key, to cause the motor to operate the clearing mechanism to clear the item-receiving register only, and upon depression of the third key, to cause the motor to operate the clearing mechanism to clear both of said registers.

4. A calculating machine of the class described having amount keys and a differential mechanism for entering items in an item receiving register having a plurality of pinions, a power driven shaft automatically operable upon depression of an amount key for actuating said differential mechanism and entering items in said item receiving register, a second register operable to accumulate amounts, means for transferring amounts from the item receiving register to said second register comprising a normally inactive single revolution clutch assembly, means for causing said clutch to be actuated by said shaft, a pair of cams arranged in predetermined fixed relation and actuated by the single revolution element of said clutch, connections from one of said cams for effecting a transfer of an amount from the item receiving register to said second register upon operation of said clutch, and connections from the other of said cams for effecting a clearing of said registers.

5. A calculating machine of the class described having amount keys and a differential mechanism for entering items in an item-receiving register having a plurality of register pinions, a total-storing register operable to accumulate a plurality of totals, means for transferring a total from the item-receiving to the total-storing register including a special differential mechanism constantly responsive to the positions of the pinions of the item-receiving register, actuators for the pinions of the total-storing register, said actuators being normally inactive, and means operable at the option of the operator for moving said actuators into engagement with said differentially positioned elements to thereby transfer the total in the item-receiving register to the total-storing register and for subsequently causing said item register to be cleared, and means for clearing the total-storing register at the option of the operator.

6. An amount-key-responsive calculator of the class described having an item-receiving registering mechanism, amount keys and a plural order amount differential mechanism, driving means for said differential mechanism, means governed by said amount keys for causing said driving mechanism to operate said differential mechanism in each order in which an amount key is depressed to thereby immediately enter the corresponding digits in the respective orders of the registering mechanism, a total-storing registering mechanism, total-transfer means for transferring a total from the item-receiving to the total-storing register, said total-transfer means being constructed and arranged to be operable by said driving means, a clearing mechanism for said item-receiving register also operable by said driving means, and total-transfer control means operable to condition said total-transfer means and said clearing mechanism and to cause said driving means to go through a cycle of operation during the first part of which said total-transfer means is operated for transferring a total from said item-receiving to said total-storing register and during the second part of which said clearing mechanism is operated to clear said item-receiving register.

7. An amount-key-responsive calculator of the class described having an item-receiving registering mechanism, amount keys and a plural order amount differential mechanism, driving means for said differential mechanism including a normally inactive electric motor, means governed by the amount keys for starting said motor and causing said driving means to operate said differential mechanism in each order in which an amount key is depressed to thereby immediately enter the corresponding digits in the respective orders of the registering mechanism, a total-storage registering mechanism, total-transfer means for transferring a total from said item-receiving to said total-storing register, a clearing mechanism for said item-receiving registering mechanism, and total-transfer control means operable to condition said total-transfer means and said clearing mechanism and to start said motor and cause said driving means to operate through a cycle during the first part of which said total-transfer means is operated and during the second part of which said clearing mechanism is operated to clear the item-receiving register.

8. An amount-key-responsive calculator of the class disclosed having a keyboard, an item-receiving registering mechanism at the front of said keyboard, depressible amount keys, a plural order amount differential mechanism, electric motor driving means controlled by said amount keys for positively actuating said differential mechanism to make it immediately responsive in its respective orders to the depression of said keys to thereby immediately enter digits in the respective orders of said registering mechanism when amount keys are depressed, a total-storing registering mechanism at the rear of said keyboard for accumulating a plurality of totals, mechanical total-transfer means extending from said item-receiving registering mechanism at the front of said keyboard to said total-storing registering mechanism at the rear of said keyboard, driving connections for said total-transfer means enabling it to be operated by said motor driving means independently of said differential mechanism, means operable at the option of the operator to condition said driving connections and to cause said motor driving means to operate them through a special cycle to move said total-transfer means independently of said differential mechanism to transfer a total from said item-receiving to said total-storing registering mechanism, and means for clearing both of said registering mechanisms.

9. An amount-key-responsive calculator of the class described having a keyboard; an item-receiving registering mechanism at the front of said keyboard; depressible amount keys, a plural order amount differential mechanism, electric motor driving means controlled by said amount keys for positively actuating said differential mechanism to make it immediately responsive in its respective orders to the depression of said keys to thereby immediately enter digits in the respective orders of said registering mechanism when amount keys are depressed; a total-storing registering mechanism at the rear of said keyboard; total-transfer means having driving connections operable by said motor driving means independent of said differential mechanism, said total-transfer means comprising one set of elements continuously responsive to the positions of the pinions of said item-receiving registering mechanism and extending from said registering mechanism toward the rear of said keyboard and a second set of elements for directly actuating said total-storing registering mechanism having portions extending from said total-storing registering mechanism toward the front of said keyboard and movable into engagement with the first set of elements to sense the same; means operable at the option of the operator for conditioning said total-transfer driving connections and causing said motor driving means to operate them through a special cycle independently of said differential mechanism to move said second set of elements into engagement with the first set to thereby transfer the total in the item-receiving registering mechanism at the front of the keyboard to the total-storing registering mechanism at the rear of said keyboard, and means for clearing both registering mechanisms.

10. An amount-key-responsive calculator of the class described having an item-receiving registering mechanism, depressible amount keys and a plural order amount differential mechanism, driving means for said differential mechanism including a normally inactive electric motor, means governed by each amount key for starting said motor and causing said driving means to operate to an extent sufficient to positively actuate the differential mechanism in the order of said key to immediately enter the corresponding digit in said registering mechanism after which said motor is stopped, a total-storing registering mechanism, mechanical total-transfer means including a single set of sensing devices for sensing a total contained in said item-receiving registering mechanism and connected with actuators for entering said total in said total-storing registering mechanism, said total-transfer means normally being maintained ineffective and including driving connections with said motor, transfer-total control means operable to start said motor and condition said total-transfer driving connections to cause said motor and driving connections to operate through a special cycle of operation during which total-transfer means transfers a total from said item-receiving to said total-storing registering mechanism while said differential mechanism remains inactive, after which said motor is stopped, and means for clearing both of said registering mechanisms.

WALTER J. PASINSKI.